Figure 1:
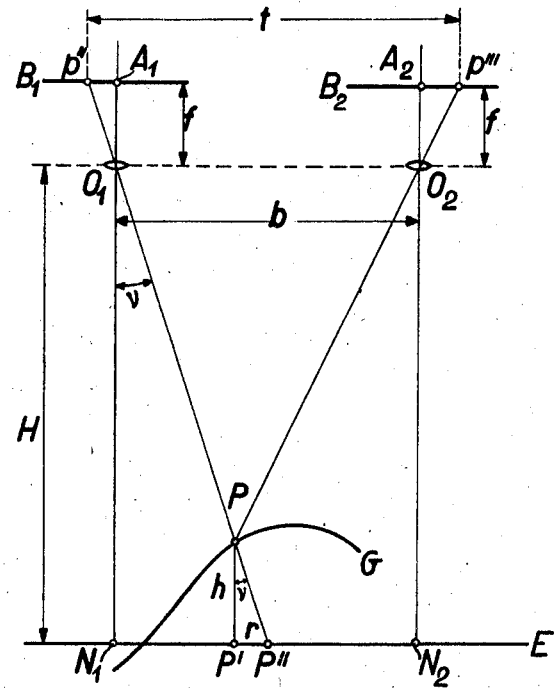

Nov. 8, 1938.  W. KERN  2,136,081
STEREOPHOTOGRAMMETRIC PLOTTING APPARATUS
Filed May 14, 1938  3 Sheets-Sheet 1

Inventor:

Wilhelm Kern

Nov. 8, 1938.   W. KERN   2,136,081
STEREOPHOTOGRAMMETRIC PLOTTING APPARATUS
Filed May 14, 1938   3 Sheets-Sheet 2

Inventor:
Wilhelm Kern

Nov. 8, 1938.                    W. KERN                    2,136,081
                  STEREOPHOTOGRAMMETRIC PLOTTING APPARATUS
                  Filed May 14, 1938         3 Sheets-Sheet 3

Inventor:
Wilhelm Kern

Patented Nov. 8, 1938

2,136,081

UNITED STATES PATENT OFFICE 2,136,081

STEREOPHOTOGRAMMETRIC PLOTTING APPARATUS

Wilhelm Kern, Jena, Germany, assignor to the firm of Carl Zeiss, Jena, Germany

Application May 14, 1938, Serial No. 207,957
In Austria May 18, 1937

4 Claims. (Cl. 33—20)

The invention concerns an apparatus for the plotting of maps from a pair of aero-stereophotogrammetric measuring images, which are disposed in a plane, by means of a plotting device and a pair of measuring marks determining a straight line parallel to the said plane, the different image points being found by displacement of the one of the said two pairs relative to the other, and the parallax being varied by adjustment of the two parts of one of the said two pairs relative to each other and parallel to the said straight line.

With a view to obtaining by means of an apparatus of this kind an orthogonal instead of a perspective plane of a landscape, the invention provides one single control lever which is universally rotatable about a point and so coupled in the known manner to the displaceable pair that its position in space permanently corresponds to that of one of the two rays which, at the time of the exposure, imaged on the two emulsion carriers that point of the landscape according to the image points of which the measuring images and the measuring marks are adjusted relatively to each other in the plotting apparatus, this apparatus being further characterized by means which cause the control lever to act on the plotting pencil in such a manner that, for any point of the landscape, regardless of what height this point assumes above a definite reference plane, the plotting pencil is displaced parallel to the plotting surface according to the distance at which, in the said reference plane, the horizontal projection of the point of the landscape lies from the perspective projection of this point in the direction of the said one ray. These means are suitably constituted by a member that is displaceable parallel to the plane of the drawing and carries the plotting pencil and is provided with a guide which is at right angles to the plane of the drawing and along which is displaceable a slide whereon the control lever is mounted for universal rotation.

The new apparatus permits the mapping of vertical photographs and, if slight errors are disregarded, of low obliques slightly deviating therefrom. Oblique photographs require being previously changed to vertical photographs.

Figure 2:
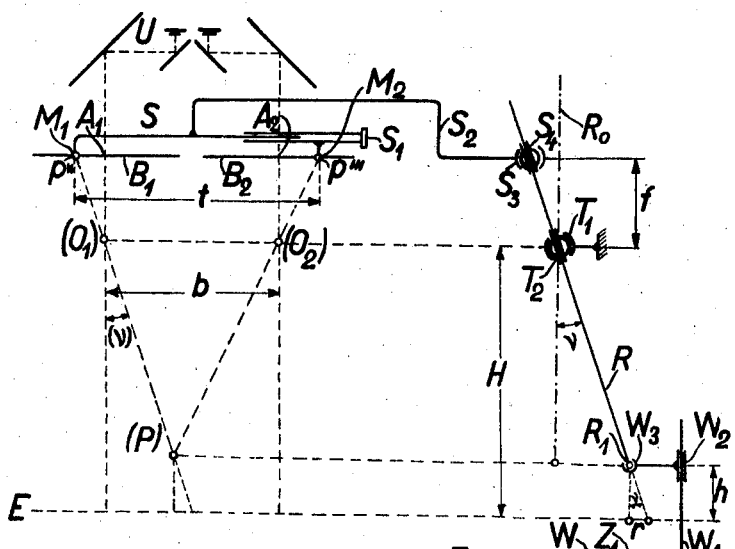
Figure 3:
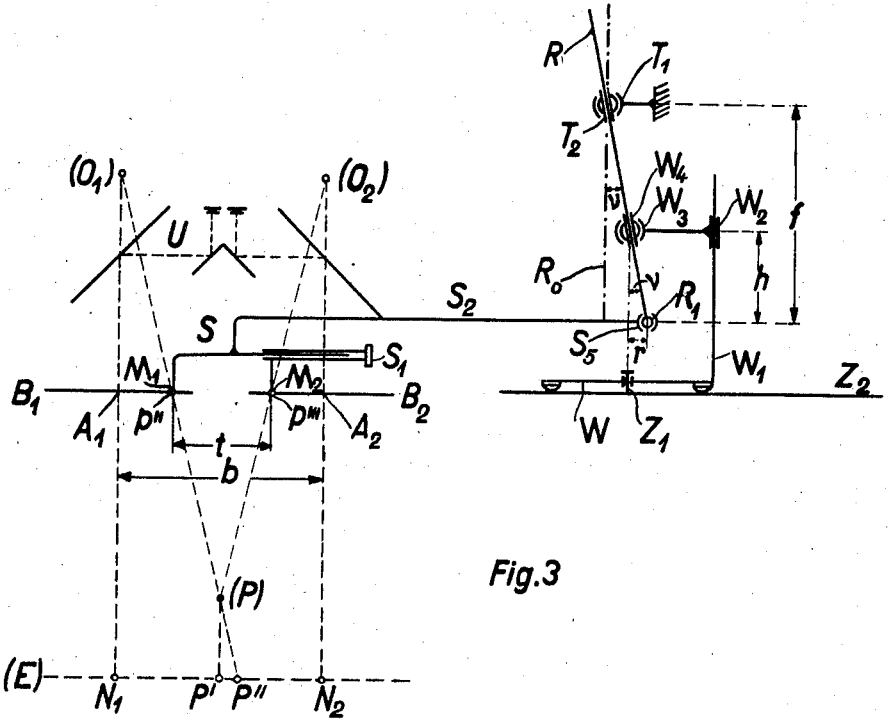
Figure 4:
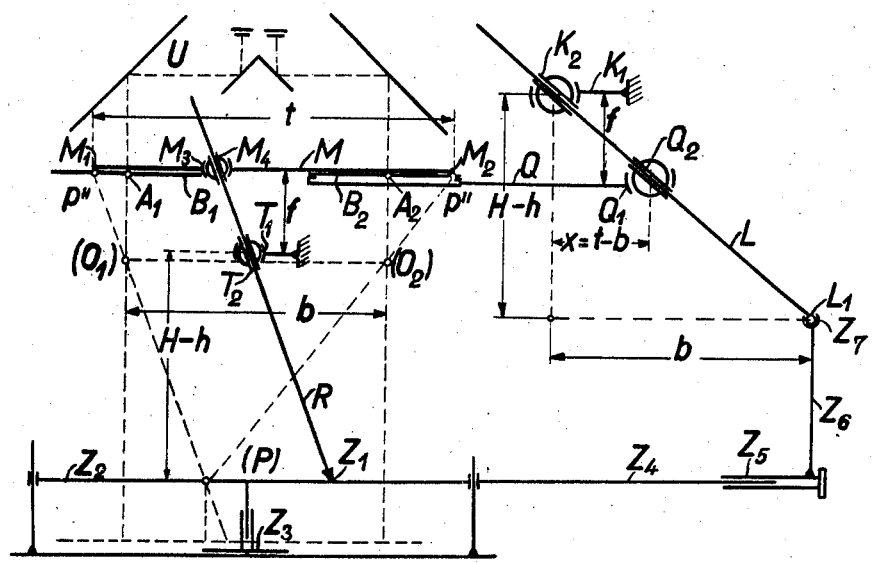
Figure 5:
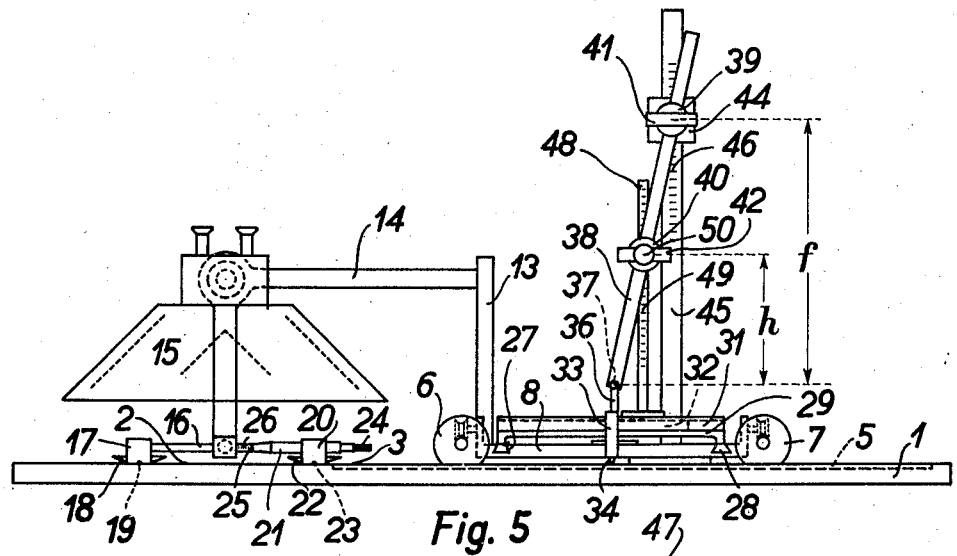
Figure 6:
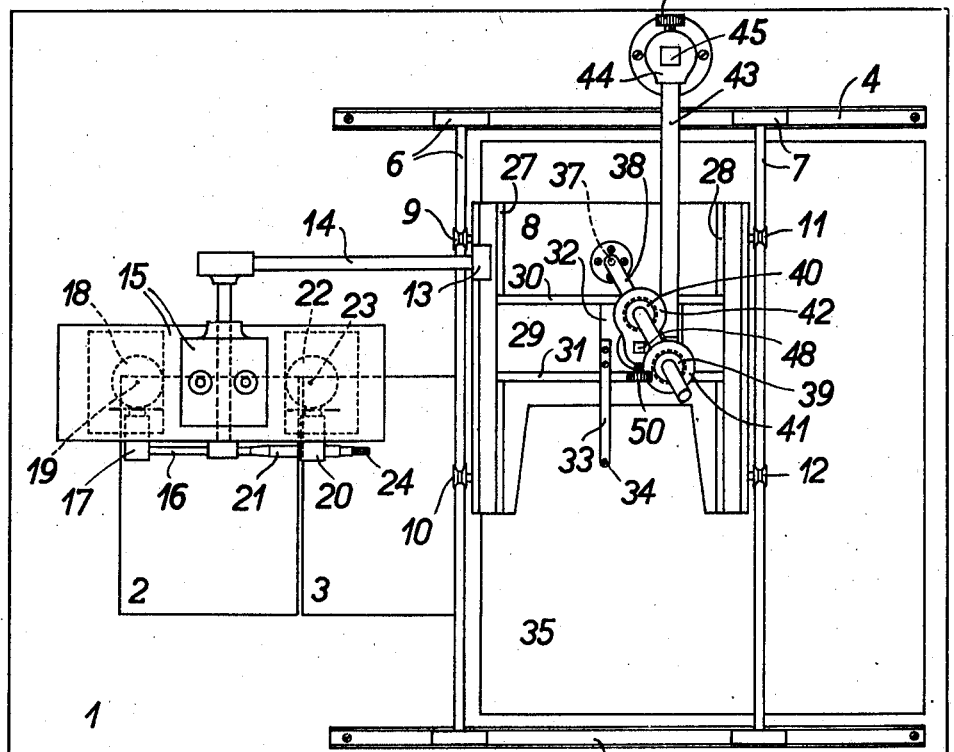

In the accompanying drawings, Figure 1 shows the conditions for photographing a landscape and is illustrative of the relations between orthogonal and perspective projections, Figures 2, 3 and 4 show schematically three different constructional forms of an apparatus according to the invention, and Figures 5 and 6 illustrate in elevational and in plan view, respectively, another constructional example.

In Figure 1, G is the landscape, which is to be photographed by two cameras the axes of whose objectives $O_1$ and $O_2$ are vertical. These objectives have the same focal lengths $f$ and are at the same heights H above a horizontal reference plane E. The horizontal distance apart of the two objectives is designated $b$. $B_1$ and $B_2$ are the two image plates, which are intersected by the objective axes at $A_1$ and $A_2$, respectively. $N_1$ and $N_2$ are the points at which the objective axes intersect the reference plane E. A point P lying in the landscape G and being at a height $h$ above the reference plane E, is imaged by the objectives $O_1$ and $O_2$ at $p''$ and $p'''$, respectively. The distance apart of the two image points $p''$ and $p'''$ is designated $t$. The difference $t-b$ is called the parallax. For the height of the point P of the landscape and the parallax holds good the equation $$\frac{t-b}{f} = \frac{b}{H-h}$$

P' and P'' are the orthogonal and a perspective projection, respectively, of the point P in the reference plane E, P'' lying in the elongation of the ray $Pp''$ and on the plate $P_1P''$ is at a distance $r$ from P', which distance corresponds to the product of the height $h$ of the point P above the reference plane E and the tangent of the angle $v$ included by P'P'' and the nadir line $O_1N_1$.

The invention aims at plotting the orthogonal projection P', and not the perspective projection P'', of the point P (and all other points of the landscape). To this effect, the plotting pencil of the plotting apparatus assumed to be known, which, without a special additional device, would plot a point corresponding to the perspective point P'', is to be displaced according to P''P'= $r=h tg v$, so as to plot a point corresponding to P'.

In Figure 2, $B_1$ and $B_2$ are two measuring images which are so fixed on the horizontal surface of a table not shown in the drawings that the points of intersection $A_1$ and $A_2$, at which, during the exposure, the axes of the objectives $O_1$ and $O_2$ had traversed the image plates corresponding to the measuring images, have a distance apart which corresponds to the base line $b$. S is a stereometer containing two measuring marks $M_1$ and $M_2$, the mark $M_2$ being adjustable relatively to $M_1$ by means of an adjusting device $S_1$, so that always that parallax $t-b$ can be adjusted which corresponds to the height of the point to be plotted. In the drawings, the measuring marks $M_1$ and $M_2$ coincide with the image points $p''$ and $p'''$, respectively, of such a point P in the landscape as is at the height $h$ above the horizontal reference plane E on which the plotting is based and above which the objectives $O_1$ and $O_2$ had been at a distance H when the image plates corresponding to the measuring images had been exposed. The stereometer S is so displaceable above the measuring images that its measuring marks can be made to coincide with any pairs of image points. The stereometer is assumed to be so guided by means of guiding devices (omitted in the drawings for the sake of simplicity) that the line connecting the measuring marks $M_1$ and $M_2$ does not change its direction. The measuring images and measuring marks are viewed by a reflecting stereoscope U which may be connected to the stereometer. An arm $S_2$ of the stereometer S carries a cup $S_3$ in which a sleeve $S_4$ is universally rotatable. $T_1$ is a stationary cup in which a sleeve $T_2$ is universally rotatable. In the two sleeves $S_4$ and $T_2$ is displaceably mounted a control lever R the lower end of which terminates in a ball $R_1$. This ball is universally rotatable in a cup $W_3$ which is supported as follows. On a horizontal plotting surface $Z_2$ is adjustable a carriage W provided with a plotting pencil $Z_1$. The carriage W has a vertical guide rod $W_1$ along which a sleeve $W_2$ is displaceable. This sleeve carries the cup $W_3$. The sleeve $W_2$ is assumed to be adjustable by means of an indicating device. It is obvious from the drawings what reciprocal positions the centres of the cups $S_3$, $T_1$ and $W_3$ are to assume. The vertical component of the distance apart of the centres of the cups $S_3$ and $T_1$ is the same as the focal lengths $f$ of the camera objectives $O_1$ and $O_2$, and the vertical component of the distance apart of the centres of the cups $T_1$ and $W_3$ corresponds to the difference $H-h$. The magnitude $h$ can be adjusted by displacing the sleeve $W_2$, this magnitude changing from contour line to contour line with respect to the points to be plotted. The position of the centre of the cup $W_3$ continuously corresponds to the point P, whose image points $p''$ and $p'''$ coincide with the measuring marks $M_1$ and $M_2$, respectively. $Z_1$ plots on $Z_2$ the orthogonal projection, regardless of the magnitude of $h$. $R_0$ indicates in dot-and-dash lines the zero position of the control lever R, which corresponds to that position of the stereometer S in which the measuring mark $M_1$ coincides with $A_1$. The control lever R is permanently parallel to the ray $PO_1p''$, which had imaged the point P on the image plate corresponding to the measuring image $M_1$.

The constructional example illustrated by Figure 3 differs from the above described in the following. The measuring images $B_1$ and $B_2$ are rotated through 180° in their plane. The perspective centres $O_1$ and $O_2$ do not, accordingly, lie below but above the measuring images, and the parallax is $b-t$. In the cup $W_3$ a sleeve $W_4$ is universally rotatable, and the control lever R is displaceably mounted in the sleeves $T_2$ and $W_4$. The ball $R_1$ of the control lever R is universally rotatable in a cup $S_5$ fast with the arm $S_2$ of the stereometer S. The vertical component of the distance of the centre of the cup $T_1$ from that of the cup $S_5$ has the magnitude $f$, and the vertical component of the distance of the centre of the cup $S_5$ from that of the cup $W_3$ corresponds to the magnitude $h$.

In the constructional example illustrated by Figure 4, the measuring images $B_1$ and $B_2$ and their perspectivity centres $O_1$ and $O_2$ assume the same reciprocal positions as in Figure 2. To adjust the parallax $t-b$, the measuring image $B_2$ on the right is displaceable along the base line $O_1O_2$. The measuring-mark carrier M is a glass ruler closely above the measuring images $B_1$ and $B_2$ and bears at its ends the two measuring marks $M_1$ and $M_2$, which have a definite distance apart. The measuring-mark carrier M is assumed to be guided above the measuring images exactly in the same manner as the stereometer S of the constructional examples described hereinbefore, so that the line interconnecting the measuring marks $M_1$ and $M_2$ lies always in the same direction. The measuring-mark carrier M bears a cup $M_3$ in which a sleeve $M_4$ is uniformly rotatable. In this sleeve $M_4$ as well as in the sleeve $T_2$, which is universally rotatable in the stationary cup $T_1$, the control lever R is displaceably disposed, the lower end of this lever bearing the plotting pencil $Z_1$. The corresponding drawing table $Z_2$ is vertically adjustable by means of a foot plate $Z_3$. The adjustment is to be effected by means of an indicating device (not represented in the drawings) in such a manner that the distance of the centre of the cup $T_1$ from the upper surface of the drawing table $Z_2$ corresponds to the magnitude $H-h$. The vertical component of the distance apart of the centres of the cups $T_1$ and $M_3$ has the magnitude $f$. To the drawing table $Z_2$ is connected an arm $Z_4$ on which, by means of a guide $Z_5$, a supporting column $Z_6$ can be displaced parallel to the base line $O_1O_2$. The supporting column bears a cup $Z_7$, in which a control lever L is universally rotatable by means of a ball $L_1$. The control lever L is displaceable in two sleeves, the one of which, $K_2$, is universally rotatable in a cup $K_1$ which is stationary and so disposed that the vertical component of the distance apart of the centres of the cups $Z_7$ and $K_1$ corresponds to the magnitude $H-h$ and that the horizontal component corresponds to the magnitude $b$. The other sleeve, $Q_2$, is universally rotatable in a cup $Q_1$ fast with an arm Q which is connected, for the parallax adjustment, to the carrier of the measuring image $B_2$ on the right. The vertical component of the distance apart of the centres of the cups $Q_1$ and $K_1$ has the magnitude $f$, so that for the corresponding horizontal component $x$ there holds good, as is obvious from the drawings, the equation $$x = \frac{bf}{H-h}$$

in which $x$ is the parallax $t-b$, as follows from the equation stated hereinbefore. Accordingly, the described control lever mechanism is to adjust the parallax automatically according to the vertical adjustment of the drawing table $Z_2$.

The plotting apparatus illustrated by Figures 5 and 6 is similar in construction to the apparatus according to Figure 3 but comprises more details. On a table 1 are fixed two measuring images 2 and 3 having such a distance apart as corresponds to the base line of the exposure cameras measured on the scale of the drawings. Two parallel rails 4 and 5 fast with the table 1 guide two wheel sets 6 and 7. By means of four grooved rollers 9, 10, 11 and 12, rotatably mounted on a plate 8, this plate 8 is displaceable along the axles of the two wheel sets 6 and 7, which are at right angles to the rails 4 and 5. The plate 8 supports a column 13 on which are fixed, by means of an arm 14, a reflecting stereoscope 15, for viewing the measuring images 2 and 3, and a rod 16. On this rod 16 is fixed a carrier 17 whose base lies on the measuring image 2 and which carries a glass cup 18 that rests on the measuring image 2 and has on its bottom a measuring mark 19. In a carrier 20 whose base rests on the measuring image 3 is fixed a sleeve 21 in which is displaceably mounted the rod 16. The carrier 20 carries a glass cup 22 which rests on the measuring image 3 and has on its bottom a measuring mark 23. By means of a screw nut 24, the distance apart of the carriers 17 and 20 and, accordingly, that of the measuring marks 19 and 23 can be changed. The adjusted distance is indicated by the edge 25 of the sleeve 21 on a scale 26 disposed on the rod 16. The plate 8 has two dove-tailed grooves 27 and 28 which are parallel to the axles of the wheel sets 6 and 7. Along these grooves 27 and 28 is displaceable a slide 29 which contains two transverse guides 30 and 31 that are at right angles to the said grooves and along which a slide 32 is displaceable. On the slide 32 is fixed an arm 33 holding a plotting pencil 34. The corresponding drawing paper 35 lies on the table 1. About a ball 37 rigidly connected by means of a pin 36 to the plate 8, a cylindrical control lever 38 is universally rotatable. This lever 38 is guided in cylindrical bores in two balls 39 and 40 which are universally rotatable in cups 41 and 42, respectively. The cup 41 is carried by an arm 43 of a slide 44. This slide 44 is adjustable along a square column 45 which is at right angles to the measuring images 2 and 3 and fast with the table 1. On a scale 46 on the column 45 the upper edge of the slide 44 indicates the component of the distance apart of the centres of the cups 37 and 39, this component coinciding with the axis of the column 45. By means of a clamping screw 47, the slide 44 can be fixed relatively to the column 45. The cup 42 is adjustable along a square column 48 so fixed to the slide 32 as to be parallel to the column 45. On a scale 49 of the column 48, an edge of the cup 42 indicates the component of the distance apart of the centres of the balls 37 and 40, this component coinciding with the axis of the column 48. By means of a clamping screw 50, the cup 42 can be fixed with respect to the column 48.

When the axis of the control lever 38, which is determined by the centres of the balls 37, 39 and 40, is parallel to the columns 45 and 48, the measuring mark 19 is to coincide with that point of the measuring image 2 which corresponds in the exposure of the corresponding image plate to the point of intersection of the emulsion layer and the axis of the objective. It is according to this condition that the measuring image 2 is to be positioned in the apparatus. The correct working of the apparatus is based, moreover, on the slide 44 being so adjusted on the column 45 that the focal length $f$ of the photographic objectives is indicated on the scale 46 and that, further, the cup 42 is adjusted on the column 48 in such a manner as to indicate on the scale 49 a magnitude which corresponds to the height $h$ of that contour plane above an assumed reference plane whose contour line is to be plotted. For each contour line to be plotted, that distance apart of two measuring marks is to be adjusted by means of the screw nut 24 and the indicating device 25, 26 which corresponds to the height H—$h$ (H being the height of the camera above the reference plane at the time of the exposure).

These adjustments having been effected, the apparatus only requires that, by displacement of the wheel sets 6 and 7 along the rails 4 and 5 and displacement of the plate 8 along the axles of these wheel sets, the arm carrying the stereoscope 15 and the measuring marks 19 and 23 is so adjusted that the pair of measuring marks 19, 23 is made to coincide with the pairs of image points whose distance apart is the same as that of the two measuring marks. Accordingly, the plotting pencil 34 plots on the drawing paper 35 the contour line corresponding to the respective pairs of image points. When changing from one contour line to another, it is only necessary to adjust the cup 42 on the column 48 according to the new height and to adjust the distance apart of the measuring marks 19 and 23 by means of the nut 24 according to the new difference H—$h$.

I claim:

1. An apparatus for the plotting of maps from a pair of aero-stereophotographic measuring images, comprising a support on which said pair of images is so disposed that the measuring images lie in one plane, another support on which a pair of measuring marks is so disposed that the two measuring marks determine a straight line parallel to said plane, the two members of one of said two pairs being disposed on the corresponding support and adjustable parallel to said straight line, said two supports being adjustable parallel to said plane and parallel to each other, a control lever universally rotatable about a point and so coupled to said adjustable support that its position in space permanently corresponds to the position of one of the two rays which, in the exposure, imaged on the two emulsion carriers that point of a landscape according to the image points of which said measuring images and said measuring marks are adjusted relatively to each other in the plotting apparatus, a plotting device consisting of a plotting pencil and a plane drawing paper, and means for so influencing said plotting pencil through the agency of said control lever that for any point in the landscape lying at any height above a predetermined reference plane said plotting pencil is adjusted parallel to said drawing paper and according to the distance at which, in said reference plane, the horizontal projection of said point lies from the perspective projection of said point in the direction of said one ray.

2. An apparatus for the plotting of maps from a pair of aero-stereophotographic measuring images, comprising a support on which said pair of images is so disposed that the measuring images lie in one plane, another support on which a pair of measuring marks is so disposed that the two measuring marks determine a straight line parallel to said plane, the two members of one of said two pairs being disposed on the corresponding support and adjustable parallel to said straight line, said two supports being adjustable parallel to said plane and parallel to each other, a control lever universally rotatable about a point and so coupled to said adjustable support that its position in space permanently corresponds to the position of one of the two rays which, in the exposure, imaged on the two emulsion carriers that point of a landscape according to the image points of which said measuring images and said measuring marks are adjusted relatively to each other in the plotting apparatus, a plotting device consisting of a plotting pencil and a plane drawing paper, a support for said plotting pencil, and a support for said drawing paper, the support for said plotting pencil being mounted on the support for said drawing paper and displaceable parallel to said drawing paper and provided with a guide at right angles to said drawing paper, and a slide adjustable along said guide, said control lever being universally rotatable on said slide.

3. An apparatus for the plotting of maps from a pair of aero-stereophotographic measuring images, comprising a base plate having a plane upper surface, means for the attachment of said measuring images on said surface, a supporting body disposed on said base plate and adjustable parallel to itself and to said surface, a reflecting stereoscope for the viewing of said two measuring images, two measuring marks near said two measuring images and determining a straight line parallel to said surface, the one of said marks being fast with said supporting body and the other of said marks being micrometrically adjustable on said supporting body along said straight line, a support mounted on said supporting body and adjustable parallel to said surface, a plotting pencil disposed on said support, a guide at right angles to said surface and fast with said support, a slide displaceable along said guide, means for displacing said slide, means for indicating the adjusted position of said slide relatively to said guide, a sleeve having a cylindrical bore and mounted on said slide for universal rotation about a point in the axis of said bore, another guide at right angles to said surface, said other guide being fast with said base plate, a member displaceable along said other guide, means for the displacement of said member, means for indicating the adjusted position of said member relatively to said other guide, another sleeve having a cylindrical bore, this other sleeve being mounted on said member and universally rotatable about a point lying in the axis of the corresponding bore, a control lever mounted on said supporting body and universally rotatable about a point and displaceable in the cylindrical bores of said two sleeves.

4. An apparatus for the plotting of maps from a pair of aero-stereophotographic measuring images, comprising a base plate having a plane upper surface, means for the attachment of said measuring images on said surface, a supporting body disposed on said base plate and adjustable parallel to itself and to said surface, a reflecting stereoscope for the viewing of said two measuring images, said stereoscope being fixed to said supporting body, two measuring marks near said two measuring images and determining a straight line parallel to said surface, the one of said marks being fast with said supporting body and the other of said marks being micrometrically adjustable on said supporting body along said straight line, a support mounted on said supporting body and adjustable parallel to said surface a plotting pencil disposed on said support, a guide at right angles to said surface and fast with said support, a slide displaceable along said guide, means for displacing said slide, means for indicating the adjusted position of said slide relatively to said guide, a sleeve having a cylindrical bore and mounted on said slide for universal rotation about a point in the axis of said bore, another guide at right angles to said surface, said other guide being fast with said base plate, a member displaceable along said other guide, means for the displacement of said member, means for indicating the adjusted position of said member relatively to said other guide, another sleeve having a cylindrical bore, this other sleeve being mounted on said member and universally rotatable about a point lying in the axis of the corresponding bore, a control lever mounted on said supporting body and universally rotatable about a point and displaceable in the cylindrical bores of said two sleeves.

WILHELM KERN.